United States Patent [19]
Di Stefano

[11] Patent Number: 5,890,513
[45] Date of Patent: Apr. 6, 1999

[54] NON-WEARING WASHER FOR FLUID VALVE

[76] Inventor: Alfonso Di Stefano, 1430 Wayburn, Grosse Pointe Park, Mich. 48230

[21] Appl. No.: 861,621

[22] Filed: May 22, 1997

[51] Int. Cl.$^6$ .......................... F16K 31/50; F16K 15/18; F16K 25/00
[52] U.S. Cl. .......................... 137/547; 137/549; 251/82; 251/120; 251/216; 251/357
[58] Field of Search ................ 251/82, 84, 118, 251/120, 215, 216, 86, 88, 356, 357; 137/547, 549, 550

[56] References Cited

U.S. PATENT DOCUMENTS

| | | | |
|---|---|---|---|
| 142,090 | 8/1873 | Earle | 137/549 |
| 589,142 | 8/1897 | Rosenberry | 251/82 |
| 963,836 | 7/1910 | Varlie | 251/82 |
| 1,001,111 | 8/1911 | Wood | 251/82 |
| 1,116,689 | 11/1914 | Gehrke | 137/549 |
| 1,216,976 | 2/1917 | Ford | 251/82 |
| 1,315,018 | 9/1919 | Harris | 251/86 |
| 1,320,446 | 11/1919 | Clark, Jr. | 251/82 |
| 1,369,444 | 2/1921 | Koplin | 251/82 |
| 1,782,758 | 11/1930 | Gavin | 137/549 |
| 1,934,314 | 11/1933 | Lawler | 251/86 |
| 1,953,448 | 4/1934 | Thaete et al. | 251/86 |
| 2,636,711 | 4/1953 | Koons | 251/86 |
| 2,888,236 | 5/1959 | Hare | 251/88 |
| 3,053,502 | 9/1962 | Brooks | 251/88 |
| 3,384,342 | 5/1968 | Passer | 251/88 |
| 3,385,560 | 5/1968 | Hare | 251/88 |
| 3,467,133 | 9/1969 | Justis, Sr. | 251/215 |
| 4,363,466 | 12/1982 | Bartlett | 251/357 |
| 4,408,745 | 10/1983 | Swiers et al. | 251/215 |
| 4,564,170 | 1/1986 | Gaines | 251/88 |
| 5,050,633 | 9/1991 | Tarney et al. | 137/454.5 |

FOREIGN PATENT DOCUMENTS

| | | | |
|---|---|---|---|
| 730977 | 8/1932 | France | 251/82 |

*Primary Examiner*—George L. Walton
*Attorney, Agent, or Firm*—Maiorana & Acosta, P.C.

[57] ABSTRACT

A non-wearing washer for fluid valve is non-fixedly mounted between washer retainer means disposed at a bottom end of a valve stem and the valve seat. The washer is retained in its operative position by configuring its top end to non-fixedly engage the washer retainer means while a tongue portion disposed on the underside of the main washer body is sized to extend down into the valve fitting end which attaches the valve to the discharging end of the fluid pipe. As the washer in non-fixedly mounted in between the bottom end of the valve stem and the valve seat, the rotation of valve stem 20 which translates into relative longitudinal displacement of the valve stem from the valve seat is not translated to the washer, thus eliminating the rotational wear now commonly associated with such washers.

16 Claims, 1 Drawing Sheet

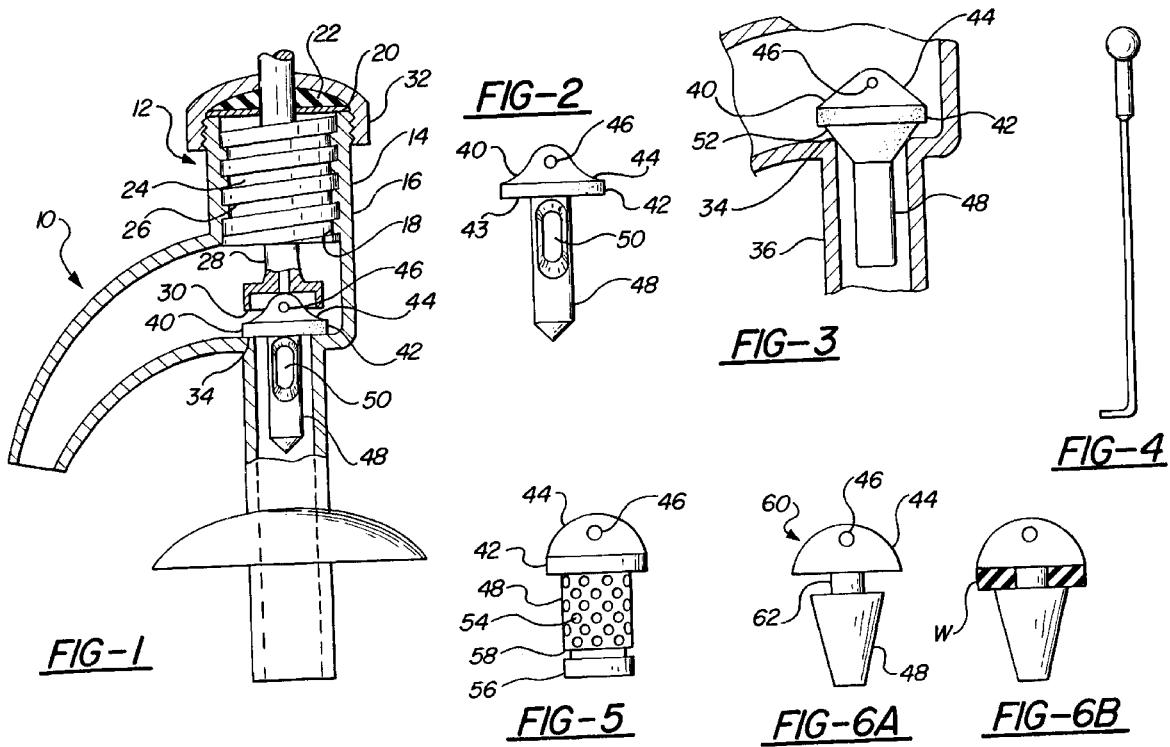

NON-WEARING WASHER FOR FLUID VALVE

FIELD OF THE INVENTION

The present invention relates to a non-wearing washer for use in a fluid valve as is typical for controlling a faucet.

BACKGROUND OF THE INVENTION

Presently, the common fluid valve for faucets uses a typical annular washer affixed to a washer retainer located at the bottom end of a valve stem. This prior art washer is typically fixedly mounted to the end of the valve stem by a screw. In operation, in a closed position, the threaded valve stem has been turned to force the washer against the valve seat, shutting off the flow of fluid through the valve. To open the fluid flow, the handle is rotated, in turn rotating the threaded valve stem to allow the washer to be displaced from the valve seat, allowing fluid to flow through the valve and out of the faucet.

In such a typical faucet, the wear on the washer which results from its rotational bearing against the valve seat when the valve is either open or shut eventually requires that the washer be replaced. While the cost of the replacement washer is modest, it is nevertheless desirable to avoid the inconvenience of the need to replace a worn washer. Moreover, the typical valve with a worn washer will be operated in that condition, with a concomitant leaking faucet and associated loss of a considerable amount of water or other fluid, for a substantial length of time before someone is finally motivated to undertake the effort of replacing the washer.

While the prior art may have attempted to address the problem of rotational wear of the washer, such attempts typically have included overly complex designs with additional parts, which may include springs, screws or additional holes. Further, it is not clear that prior art replacement washers, whether or not aimed at the problem of rotational wear, are capable of being retrofit to existing typical valve construction.

It is therefore an object of the present invention to provide a non-wearing washer capable of use between a lower end of a faucet valve stem and the valve seat to selectively seal off the flow of fluid through the valve. It is a further object of the present invention to eliminate the rotational wear of the common washer now typically fixedly mounted at the end of the valve stem by replacing such a washer with a non-fixedly mounted washer which is thus free of rotational wear. It is another object of the present invention eliminating or reducing the need to replace a worn washer, along with eliminating the associated loss of leaking fluid and replacement efforts. It is still another object of the invention to provide a non-rotationally mounted washer of simple design which eliminates the need for additional parts. Yet another object of the present invention is to provide a non-wearing washer capable of use in retrofitting existing valves, that is, capable of being used as either a replacement washer or an original washer in existing valve designs.

A further object attained in an alternative embodiment of the subject invention is to provide a non-wearing, non-fixedly mounted valve washer with means to support a fluid filter.

Finally, another object of an alternative embodiment of the present invention is to provide a washer holder adapted to receive a standard, current art washer which, in combination with the washer holder provides the advantages set forth above.

SUMMARY OF THE INVENTION

These and other objects of the invention are accomplished by providing a non-wearing washer with the following features. The washer of the subject invention is non-fixedly mounted between a washer retainer disposed at a bottom end of the valve stem and the valve seat. The subject washer has a main washer body which serves the typically function of sealing the fluid flow from the source pipe by seating against the valve seat. However, rather than being fixedly mounted to the washer retainer disposed at the end of the rotating valve stem, the subject washer is non-fixedly mounted between the washer retainer and the valve seat.

More particularly, the washer of the present invention has a tongue portion disposed from the lower side of the main washer body which extends down past the valve seat into the fluid pipe which is the source of fluid flow. A shoulder portion is disposed on the top side of the main washer body and non-fixedly seats against the washer retainer disposed at the end of the valve stem. In this manner, the washer is non-fixedly mounted between the washer retainer and the valve seat and is maintained in operative position by the tongue portion of the washer, a part of which always remains within the valve fitting end connecting the valve to the fluid pipe, even when the valve stem is in its fully open position. Maintenance of the subject washer in its operative position is also facilitated by fluid pressure from the fluid pipe which urges the floating washer, and more particularly the shoulder portion of the washer, against the washer retainer.

To assist in the flow of fluid past the washer when the valve stem is in an opened position, a fluid passage opening may be provided in the tongue portion of the subject washer. To the same end, the tongue portion can be tapered.

In an alternative embodiment, a hip portion intermediate the main washer body and the tongue portion may be of frustoconical configuration to increase the sealing capability of the washer against the valve seat.

In another alternative embodiment, the tongue portion may be adapted to receive a filter, if desired. In this alternative embodiment, the tongue portion is hollow and cylindrical, providing space for the insertion of an appropriate fluid filter. The cylindrical sides forming the tongue portion are provided with a plurality of holes to allow the fluid to flow past the washer in an open position, after having passed through the filter. The end of the tongue portion may be provided with means to retain the filter in its operative position within the hip portion, such filter retaining means also providing for selective removal and replacement of the filter when necessary.

In still another alternative embodiment of the present invention, a washer holder of generally similar configuration as described above is adapted to receive a typical current art washer which, in combination with the washer holder, still provides the advantages associated with the other embodiments of the present invention. Generally in this embodiment, the main washer body of the embodiments earlier described is replaced with means to retain a standard washer. Specifically, an appropriately sized waist portion adapted to receive the standard washer is disposed between the shoulder portion and the tongue portion of the first embodiment, in place of the main washer body.

Finally, the washer can be Teflon coated, or similarly treated with a low friction coating on its bearing surfaces to increase the wear of the washer. The shoulder portion of the washer may be provided with an engaging hole suitable for engagement by an appropriately hooked engagement tool to facilitate in the removal of the washer when necessary.

Other advantages of the invention will be readily appreciated as the same becomes better understood by reference to the following detailed description when considered in connection with the accompanying drawings, wherein:

BRIEF DESCRIPTION OF THE DRAWINGS

FIG. 1 is a longitudinal sectional view of a typical fluid valve for a faucet, in which the typical, permanently affixed washer is replaced by the non-fixedly mounted washer of the subject invention;

FIG. 2 is a side view of the subject washer illustrating its component parts;

FIG. 3 is a fragmentary sectional view of valve seat area with an alternative embodiment of the subject washer; and FIG. 4 is a side view of an appropriate engaging tool which can be used to remove the subject washer from the internal area of a valve, when necessary.

FIG. 5 illustrates an alternate embodiment of the present invention.

DETAILED DESCRIPTION OF THE PREFERRED EMBODIMENT(S)

FIG. 1 shows a faucet 10 having a common fluid valve 12 in which the typical prior art fixedly mounted washer has been replaced by the non-fixedly mounted, non-wearing washer 40 of the subject invention. The valve 12 includes a main valve body 14 including a bonnet 16. The bonnet 16 is provided with internal bonnet threads 18. The valve 12 also has a valve stem 20 of generally longitudinal configuration which includes a top end 22 and valve stem body 24. Valve stem body 24 is provided with threads 26 which are cooperatively mated with bonnet threads 18 to allow relative movement between the valve stem and the bonnet 16 of valve 12. Valve stem 20 also has a second, bottom end 28, at which is disposed washer retainer means 30. At its first, top end 22, valve stem 20 is fitted with a handle 32. When handle 32 is turned, the threads 26 of valve stem body 24 operatively engage bonnet threads 18 to allow relative movement of valve stem 22 with respect to bonnet 16 and main valve body 14.

In the prior art, a conventional annular washer is fixedly secured to washer retainer 30, typically by means of a common screw. To turn off the flow of fluid, the handle 32 is rotated, which in turn rotates valve stem 20 causing it to move downwardly relative to main valve body 14. At the bottom of the longitudinal down stroke of the valve stem 20, the prior art washer secured to washer retainer 30 rotates into a final closed position against valve seat 34 shutting off the flow of water coming through the bottom valve fitting end 36 of valve 12 which fits the valve 12 to the discharging end of the fluid pipe. To open the flow of fluid through the valve 12, the process is reversed, with the handle being rotated in the opposite direction, rotating the washer upwardly and away from valve seat 34. This constant wear of the prior art washer as it is rotated to bear against the valve seat 34 in both the opening and closing process eventually leads to the need to replace such prior art washer.

The fluid valve washer 40 of the present invention eliminates the rotational wear of the prior art washer as it bears against valve seat 34 to shut off the flow of fluid through valve 12. As seen in FIG. 2, the non-wearing washer 40 of the present invention has a main washer body 42 which has a flange area 43. The flange area 43 of the main washer body 42 bears against valve seat 34 to shut off the flow of fluid through valve 12. Washer 40 also has a shoulder portion 44 which may include an engagement hole 46. Washer 40 also includes a tongue portion 48 which may be provided with a fluid passage opening 50 to facilitate the flow of fluid past the washer as explained in further detail below.

As seen in FIG. 1, the washer 40 of the present invention is interposed between valve seat 34 and washer retainer 30. Unlike in the prior art, washer 40 is not fixedly mounted to washer retainer 30. Rather, washer 40 is retained in its appropriate position by the following factors. The top end of shoulder portion 44 is configured to cooperatively engage washer retainer means 30 disposed from bottom end 28 of valve stem 20. While the actual configuration of the mating cooperation between the shoulder portion 44 and washer retainer 30 disposed at the bottom end 28 of valve stem 20 is not critical, what is important is that the washer 40 is not fixedly mounted to valve stem 20.

As is shown in FIG. 1, the typical washer retainer means provided in the existing art is a cup shaped washer retainer 30 suitable for engaging the typical prior art annular washer. Shoulder portion 44 may have its top configured so that fits within the cup area of washer retainer 30. As is illustrated here, it is not important that the end of shoulder portion 44 be sized to fully fit within the cup area of washer retainer 30. In fact, since it is important to the present invention that washer 40 be freely, and non-fixedly mounted between valve stem 20 and valve seat 34, any possible friction fit between the top of shoulder portion 44 and washer retainer 30 is to be avoided to ensure that any rotation of the valve stem 20 is not transferred to washer 40.

As also seen in FIG. 1, tongue portion 48 of washer 40 extends down into the valve pipe fitting end 36 to assist in maintaining washer 40 in its operative position between bottom end 28 of valve stem 20 and valve seat 34. It is important in sizing the length of tongue portion 48 to consider the maximum axial distance of bottom end 28 from valve seat 34 when the valve 12 is in its fully open position. In this full open position, it is important that a sufficient amount of the length of tongue portion 48 remains within valve fitting end 36 to ensure that washer 40 is not dislodged from its operative position between washer retainer 30 and valve seat 34.

Two design features may be added to tongue portion 48, either independently or in combination, to increase the flow of fluid past washer 40 when the valve 12 is in an open position. First, tongue portion 48 may be provided with a fluid passage opening 50. When the valve 12 is opened, at least some portion of fluid passage opening 50 rises above valve seat 34, allowing an additional amount of fluid to flow past washer 40 and into valve 12. Additionally, tongue portion 48 may itself be tapered to a narrower diameter as it descends from main washer body 42, again allowing more fluid to flow past washer 40 when valve stem 20 is opened.

In operation, a valve 12 provided with a washer 40 of the present invention minimizes or eliminates the rotational wear associated with the prior art fixedly mounted washers. Since washer 40 is non-fixedly mounted, the rotation of valve stem 20 into a closed position is not translated to freely mounted washer 40. Thus, while the closing of valve stem 20 forces the flange 43 of washer 40 down against valve seat 34, shutting off the flow of fluid in valve 12, the rotational movement of the valve stem 20 is not translated through washer retainer 30 to the present washer 40. Thus washer 40 experiences no rotational wear of flange 34 against valves of flange 43 against valve seat 34 as the valve is closed.

In like manner, when valve 12 is opened, again no rotational movement of valve stem 20 is transferred to washer 40. Thus, as valve stem 20 is opened, the fluid passing through the discharge end of the fluid pipe provides sufficient pressure to raise washer 40 such that its flange 43 is displaced from valve seat 34 without rotational wear on the washer 40. It will appreciated by those skilled in the art that the pressure of fluid against the flange 43 of washer 40 will assist in bearing washer 40 against washer retainer 30. Thus, the fluid pressure will cooperate with the length of tongue portion 48 which always remains in valve fitting end 36, even when the valve 12 is in a fully opened position, to maintain washer 40 in a non-fixed, but operative position between washer retainer means 30 disposed at bottom end 28 of valve stem 20, and valve seat 34.

In an alternative embodiment, washer 40 may be provided with a hip portion 52. As shown in FIG. 3, hip portion 52 is of frustoconical configuration with the wider, top portion being disposed nearest the underside of main washer body 42 and the narrower portion being disposed nearest the tongue portion 48. As seen in the fragmentary view of valve 12 shown in FIG. 3, it is hip portion 52 which bears against valve seat 34 to shut off the flow of fluid in valve 12 when in the closed position. In an appropriate configuration adapted for use with an appropriately shaped valve seat area, it is anticipated that this conical embodiment will provide a sealing capability of virtually 100%. Again, because washer 40 is freely mounted in the position between valve stem 20 and valve seat 34, this embodiment also eliminates rotational wear on washer 40 when the valve is opened or closed. Moreover, while this embodiment with a conical hip portion 52 may be better suited to use with a horizontally oriented fixture, it is expected that any embodiment of the present invention will operate well in either a vertical, horizontal, or partially horizontal orientation.

The washer 40 of the present invention may be formed of any appropriate material, including the material of the current typical washer, a rubber, plastic or hardened plastic type of material, or a ceramic or a metal material. The washer 40 may also be Teflon coated or similarly treated with a low friction coating on its bearing surfaces or in its entirety, to increase the wear of washer 40. In any case, the simple design of the subject washer 40 as a unitary piece will facilitate the manufacture of the device, regardless of the material or coating used.

Shoulder portion 44 of washer 40 may be provided with an engaging hole 46 for engagement by an appropriately hooked engagement tool, as shown in FIG. 4, to facilitate the removal of washer 40 from valve 12, when necessary.

In an alternative embodiment illustrated in FIG. 5, the subject invention has been modified to allow it to be fitted with a filter through which the fluid passes before exiting the valve in which the washer is placed. Specifically, the sides of cylindrical tongue portion 48 are provided with at least one, and preferably a plurality of holes through which the filtered fluid may pass when the valve is in an open position.

In this embodiment, the subject washer 40 is also provided with selectively removable filter securement means 56 which allows the filter to be selectively secured in hollow tongue portion 48, the selectively removability of filter securement means 56 allowing replacement of the filter when necessary. As will be appreciated by those of skill in the art, filter securement means 56 can take a variety of forms and the specific configuration of securement means 56 shown here, an end cap, is merely exemplary of such configurations. In the embodiment shown in FIG. 5, securement means 56 is an end cap which is sized to provide a friction fit within hollow cylindrical tongue portion 48. Alternatively, end cap 56 could be threaded for securement within tongue portion 48 or secured in other means known to the current art. Of course, it is an important feature that in whatever configuration filter securement means 56 takes, there be appropriate flow of fluid through the securement means 56, to direct the fluid flow through the filter placed within hip portion 48, and then through the plurality of holes 54 when the valve 12 is in an open position.

Finally, filter securement means 56 may be provided with a slot 58 adapted to receive an O-ring or similar seal which will seat against the interior of valve fitting end 36 to ensure that any flow of fluid is solely through the filter within tongue portion 48, if so desired. Alternative sealing means known to the art, for example, sizing the end cap 56 to provide a sealing function, may also be used.

In yet another configuration of the present invention illustrated in FIGS. 6a and 6b, the subject invention may provide a washer holder 60 of generally similar configuration as washer 40 described in the embodiments above. In the washer holder embodiment shown in FIG. 6a, the washer holder 60 has no main washer body 42 as in previous embodiments, but has shoulder portion 44 and tongue portion 48. In place of washer body 42, the washer holder 60 is provided with a waist portion 62 disposed between shoulder portion 44 and tongue portion 48. Waist portion 62 is sized to receive a standard washer W, as shown in FIG. 6b. The specific configuration of tongue portion 48 is not critical so long as some upper surface of tongue portion 48, or some lower surface of hip portion 44, or both, provide a seating waist portion 62 within which a standard washer W is seated in operative position. As should be readily appreciated, washer holder 60 is adapted to receive a standard washer most conveniently by slipping the washer W over tongue portion 48 into its receiving waist portion 62.

While the actual dimensions of washer holder 60 can be appropriately varied to meet the size requirements of the valve in which washer holder 60 is to be placed, and to meet the size requirements of the standard washer to be used, a typical configuration may be as follows. In overall axial length, washer 60 may be ¾ inch, with shoulder portion 44 having an axial length of approximately ¼ inch. Thus, the axial length of waist portion 62 and hip portion 48 may be ½ inch. Hip portion alone may be 5/16 inch long which then means that waist portion 62 would be 3/16 inch long in its axial direction. Again, while washer holder 60 could be made of any appropriate material, including those described herein in connection with other embodiments of the invention, in the particular embodiment described here, washer holder 60 may preferably be formed of brass.

It will be understood that by means of this embodiment of washer holder 60, the subject invention allows a standard washer to be used while still achieving the advantages of washer 40 as provided in its alternative embodiments described above.

It will be readily appreciated to those of skill in the art that the subject invention may be conveniently adapted for use where the fluid is other than a liquid such as water, i.e., where the fluid is a gas or the like, which may be pressurized.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. An apparatus comprising:

a fluid valve washer non-fixedly mounted between a valve seat and a washer retainer disposed at an end of a valve stem, said washer having:

a main washer body; and a tongue portion depending from a lower surface of said main washer body, said tongue portion being unitary with said main washer body and being adapted to extend within a valve pipe fitting, wherein said tongue portion is of a generally hollow cylindrical configuration and comprises a fluid passage opening allowing fluid to pass from said valve pipe when said washer is not engaged with said valve pipe.

2. The apparatus of claim 1 wherein said washer further comprises a shoulder portion disposed on a first, upper surface of said main washer body, said shoulder portion adapted to engage the washer retainer means.

3. The apparatus of claim 2 wherein said shoulder portion further comprises an engaging hole adapted to receive an engaging device.

4. The apparatus of claim 1 wherein said tongue portion is tapered from a wider diameter adjacent said m a in washer body to a narrower diameter distal from said main washer body.

5. The apparatus of claim 1 further comprising a hip portion disposed between said main washer body and said tongue portion, said hip portion being of generally frustoconical configuration with the wider frustoconical end disposed nearest said main washer body and the narrower frustoconical end disposed nearest the tongue portion.

6. The apparatus of claim 1 further comprising selectively removable filter securement means for securing the filter within said hollow of said tongue portion.

7. The apparatus of claim 1 further comprising a low-friction coating.

8. A fluid valve adapted to be attached to a fluid pipe, said fluid valve comprising:

a main valve body having a valve seat and a valve fitting end adapted to connect to the discharging end of the fluid pipe;

a bonnet having internal bonnet threads;

a valve stem of generally longitudinal configuration, having a first, top end, a centrally disposed valve stem body and a second, bottom end, said bottom end having a washer retainer, wherein said valve stem body is threaded in complementary fashion to said bonnet threads to provide for axial movement of the valve stem relative to the bonnet; and a washer non-fixedly mounted between said washer retainer and said valve seat, said washer having a main washer body and a tongue portion depending from a lower surface of said main washer body, said tongue portion being unitary with said main washer body, wherein said tongue portion is of a generally hollow cylindrical configuration and adapted to receive a fluid filter within said hollow interior and said tongue portion also having at least one hole through which filtered water may pass.

9. The fluid valve of claim 8 wherein said washer further comprises a shoulder portion disposed on a first, upper surface of said main washer body, said shoulder portion adapted to engage the washer retainer means.

10. The fluid valve of claim 9 wherein said shoulder portion further comprises an engaging hole adapted to receive an engaging device.

11. The fluid valve of claim 8 wherein said tongue portion is tapered from a wider diameter adjacent said main washer body to a narrower diameter distal from said main washer body.

12. The fluid valve of claim 8 wherein said washer further comprising a hip portion disposed between said main washer body and said tongue portion, said hip portion being of generally frustoconical configuration with the wider frustoconical end disposed nearest said main washer body and the narrower frustoconical end disposed nearest the tongue portion.

13. The fluid valve of claim 8 wherein said tongue portion further comprises at least one fluid passage opening.

14. The fluid valve of claim 8 wherein said washer further comprising a low-friction coating.

15. An apparatus comprising:

a unitary fluid valve washer holder non-fixedly mounted between a valve seat and an end of a valve stem, said washer holder having:

a waist portion adapted to receive a washer; and a tongue portion depending from a lower surface of said waist portion, said tongue portion adapted to extend within a valve pipe fitting, wherein said tongue portion is of a generally hollow cylindrical configuration and adapted to receive a fluid filter within said hollow interior and said tongue portion also having at least one hole through which filtered water may pass.

16. The apparatus of claim 15 wherein said washer further comprises a shoulder portion disposed on a top side of said waist portion opposite from said tongue portion.

\* \* \* \* \*